United States Patent [19]

Abrams et al.

[11] 4,215,324
[45] Jul. 29, 1980

[54] SPATIAL ENCODING OF A LASER BEAM BY MEANS OF A STARK CELL MODULATOR

[75] Inventors: Richard L. Abrams, Pacific Palisades; David M. Henderson, Playa Del Rey, both of Calif.

[73] Assignee: Hughes Aircraft Company, Culver City, Calif.

[21] Appl. No.: 930,108

[22] Filed: Aug. 1, 1978

[51] Int. Cl.² ............................................. H01S 3/10
[52] U.S. Cl. ............................ 332/7.51; 331/94.5 M; 350/356; 244/3.16
[58] Field of Search .................. 332/7.51; 331/94.5 M; 362/259; 350/355, 356; 244/3.13, 3.16

[56] References Cited

U.S. PATENT DOCUMENTS

| | | | |
|---|---|---|---|
| 3,304,428 | 2/1967 | Peters | 332/7.51 |
| 3,398,918 | 8/1968 | Girault | 244/3.13 |
| 3,527,532 | 9/1970 | Mocher | 332/7.51 |
| 3,644,017 | 2/1972 | Ploss | 350/356 |
| 3,691,484 | 9/1972 | Dore | 332/7.51 |
| 3,766,498 | 10/1973 | Brewer et al. | 332/7.51 |
| 3,806,834 | 4/1974 | Johnston et al. | 332/7.51 |
| 3,809,477 | 5/1974 | Russell | 356/5 |
| 4,030,686 | 6/1977 | Buchman | 244/3.13 |
| 4,085,387 | 4/1978 | Asawa et al. | 332/7.51 |
| 4,103,260 | 7/1978 | Buchman | 332/7.51 |
| 4,119,929 | 10/1978 | Schackleford et al. | 350/356 |
| 4,149,686 | 4/1979 | Stariff et al. | 244/3.13 |

OTHER PUBLICATIONS

Nethercot, "Light Modulator", 12/63, pp. 55–56, IBM Tech. Disc. Bull., vol. 6, #7.

*Primary Examiner*—Nelson Moskowitz
*Attorney, Agent, or Firm*—Kenneth W. Float; W. H. MacAllister

[57] ABSTRACT

Apparatus for coding a laser beam to provide guidance signals, or the like. In the transmitter, the laser beam traverses two modulators to provide two-dimensional encoding. In the receiver, the detected signals are amplified, frequency-discriminated, and mixed to form guidance signals. The modulator is a modified Stark cell wherein four split longitudinal planar electrodes allow for beam enclosing as a function of two frequencies by the process of molecular absorption. Bias and modulating signals applied to the electrodes interact with the molecular absorbing gas and with the beam to encode position information as a function of the specific frequencies. The amplitude of the first encoding frequency varies from a maximum at one edge of the beam, decreasing to a minimum at the opposite edge, and vice versa for the second encoding frequency. The amplitudes of both are equal on beam center. A second embodiment utilizes a pair of internal bias electrodes and four external electrodes to apply bias and modulating signals. The modulator wall is thin for penetration of the modulating signals so as to interact with the beam. A third embodiment utilizes four semicircular disc electrodes transparent to laser light affixed to the cell endcaps to provide both bias and modulation. A gas separates electrodes affixed to the same endcap. The endcaps are oriented such that the gaps are mutually perpendicular to allow for orthogonal encoding of the beam.

10 Claims, 14 Drawing Figures

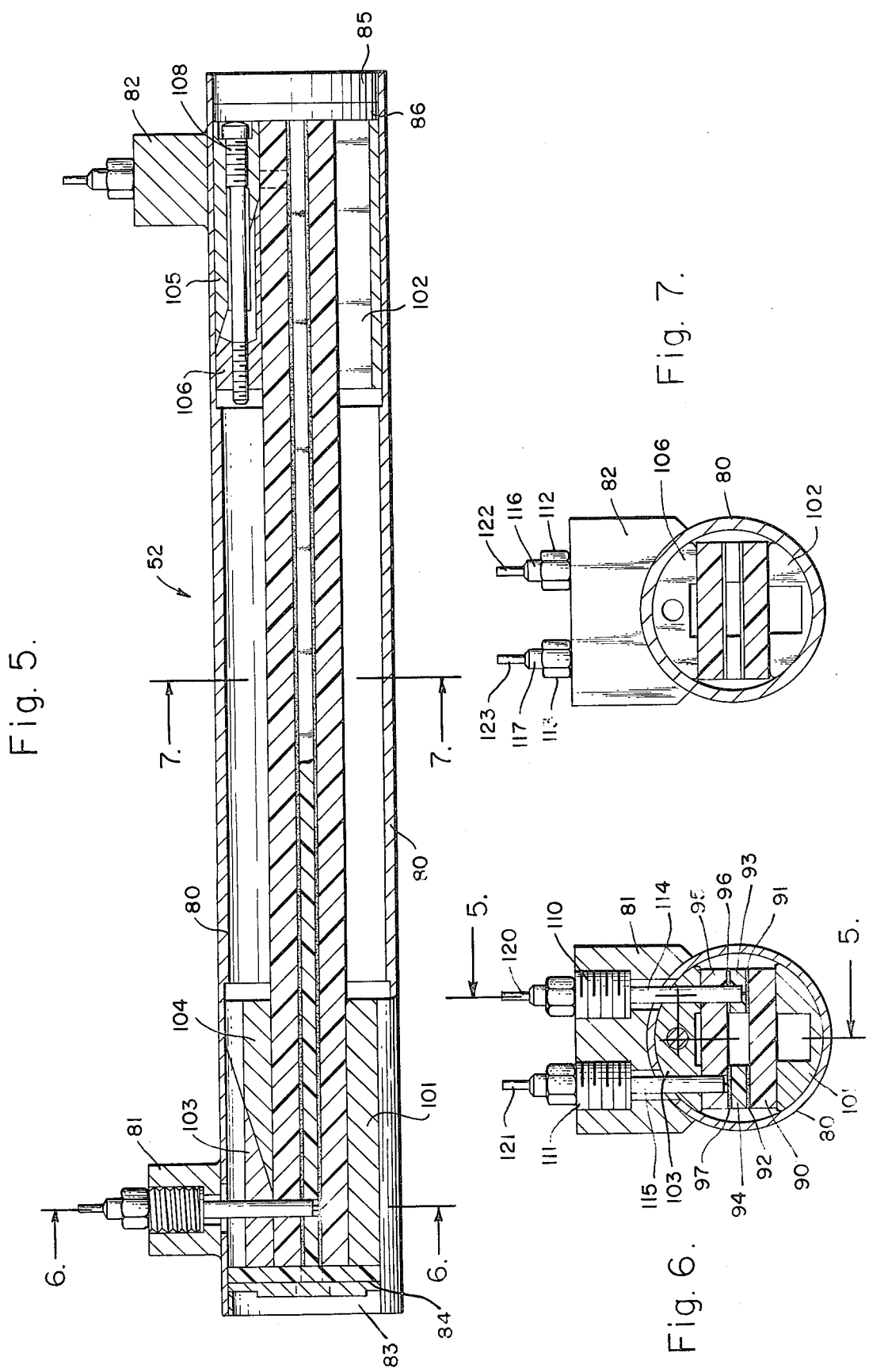

a.

b.

c.

Fig. 12.
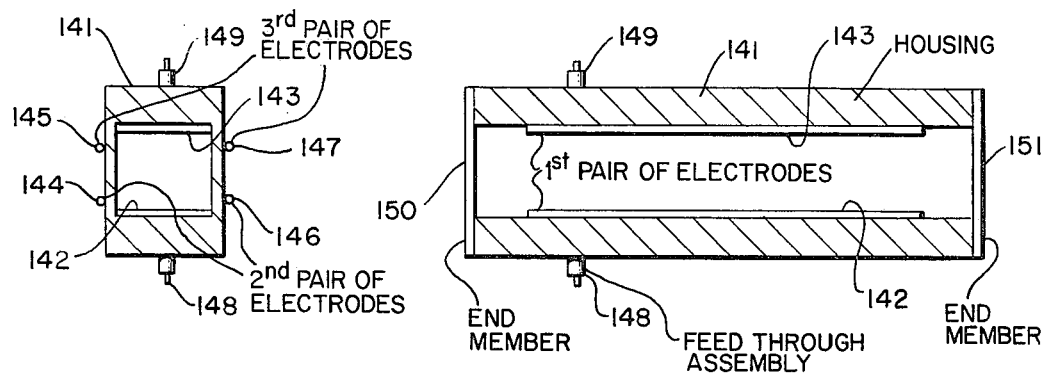
Fig. 13.
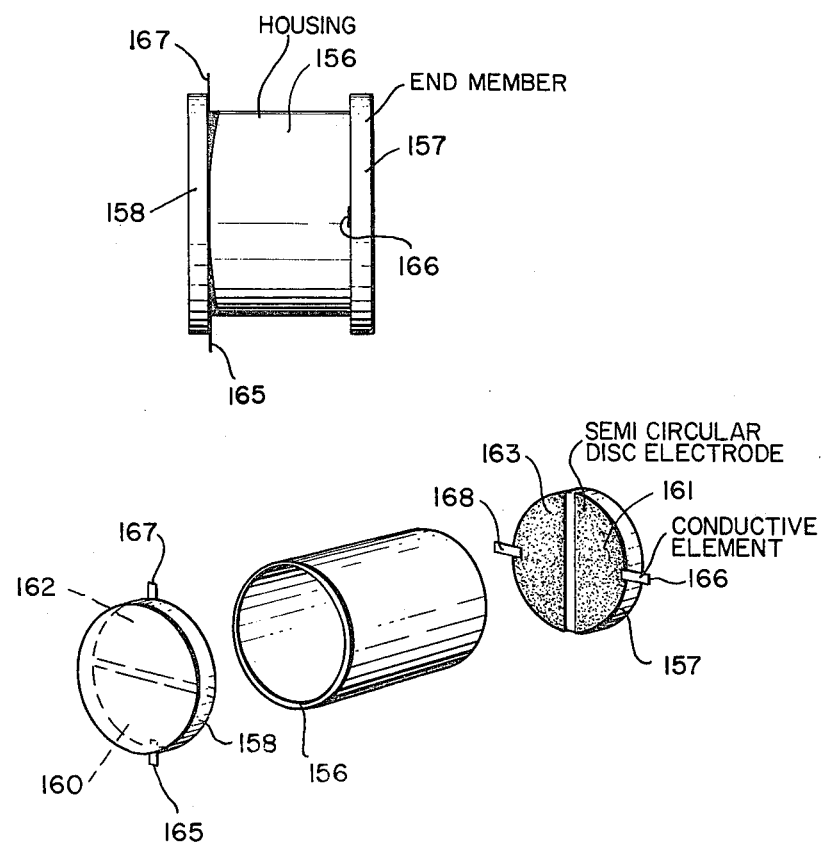
Fig. 14.

SPATIAL ENCODING OF A LASER BEAM BY MEANS OF A STARK CELL MODULATOR

BACKGROUND OF THE INVENTION

This invention relates generally to laser guidance systems, and more particularly, to systems which spatially encode a laser beam with position information.

One application of this invention is in the field of missile guidance systems which operate to cause a missile to fly down the center of a transmitted beam, such as a beam-rider guided missile. The advent of the laser has provided a very accurate transmission means for use in these guidance systems.

A typical guidance system incorporates a laser transmitter located at the missile launch point and a receiver located on the missile. The receiver decodes information transmitted by the laser which provides guidance signals to the missile navigation system.

Numerous methods for coding a laser beam have been developed. These include opto-mechanical, electro-optic, acousto-optic and Stark effect modulation. The present invention embodies an improvement in the design of a Stark cell modulation system to produce guidance and control signals.

Most systems attempting to spatially encode a laser beam have utilized polarization coding using electro-optical modulators. These systems require a polarization sensitive receiver which severely limits the field-of-view and generally requires two detectors.

Although systems have been built utilizing electro-optic modulators which need only one detector, the present invention circumvents the polarization problems by using a receiver having a single polarization insensitive detector. Additionally, the need for expensive electro-optical crystals is eliminated.

The electro-optical modulator systems also generally have problems implementing automatic gain control (AGC) functions, especially if the receiver requires two detectors.

Stark effect modulation of laser energy is generally well known and described in numerous texts, articles and patents, including, "Modulation of the 3.394μ Ne line by Electro-Optic Gases" by A. Landman, *Journal of Applied Physics*, Vol. 38 (1967), pages 3668–3675, and Johnson et al, U.S. Pat. No. 3,806,834 entitled "Stark Effect Modulation of $CO_2$ Laser with $NH_2D$". Stark effect modulation has also been used to stabilize laser operation as in U.S. Pat. No. 3,921,099 by R. L. Abrams and T. A. Nussmeier, entitled "Frequency Stabilized Laser".

Modulation of a laser beam by means of the Stark effect utilizes a cell containing a confined gas having a molecular absorption resonance at or near the output frequency of the laser. The resonance can be frequency tuned across the laser bandwidth by generation of a suitable electric field within the cell.

Varying the applied electric field results in changing the resonant frequency of the absorbing gas. Application of an AC modulation signal in addition to the applied DC electric field allows for modulation of the laser beam at the AC modulation frequency.

Previous systems and studies utilizing Stark effect modulators have generally been limited to spectroscopic applications and modulation involving only one modulation frequency.

Thus, it is an object of this invention to provide a means for encoding a laser beam with position information across at least one dimension of the laser beam.

A further object of the invention is to provide an improved position determining system which is adaptable for use in optical beam-rider guidance systems.

Another object of the present invention is to provide an improved system for determining the position of remotely located objects.

SUMMARY OF THE INVENTION

In accordance with these and other objects of the invention, there is provided a transmitter-receiver combination which is an improved system for guiding a missile down the center of a transmitted laser beam, and more particularly, a system which transmits and detects position information encoded onto a laser beam for guidance purposes, or the like.

The system comprises a transmitter and a receiver. The transmitter includes a laser, two modulators, a half-wave plate, and three lenses to focus the laser beam onto the modulators and to direct the beam toward the receiver. The receiver includes an optical filter and a lens to focus the laser energy onto a detector. The detected signals are preamplified, amplified and then frequency discriminated and mixed to form guidance signals.

More specifically, the modulator includes a housing having optically transmissive endcaps constructed to form a gas-tight structure. A molecular absorbing gas is supplied to the gas-tight structure by means of a gas fill tube.

Internal to the housing are two pair of coplanar electrodes, the individual electrodes of each pair being separated by a small gap. The electrode pairs are offset away from the central longitudinal axis on either side thereof in a symmetrical manner and lie parallel to the central axis.

Two feedthrough platforms are provided which house electrical terminals for applying external signals to the modulator electrodes. The electrodes are connected in an individual manner to four electrical contacts housed in the feedthrough platforms.

In operation, modulation signals at two separate frequencies are applied to the modulation electrodes. The electric fields interact with the molecular absorbing gas and the laser beam such that the beam is encoded as a function of frequency. The encoding is a maximum at a first predetermined frequency at one edge of the beam and decreases to a minimum at the opposite edge and vice versa for the second predetermined frequency.

A second embodiment of the modulator includes a housing having affixed thereto optically transmissive endcaps which form a gas-tight structure for confining a molecularly absorbing gas. Two feedthrough platforms are affixed to the housing to allow bias signals to be applied to electrodes within the housing.

Two parallel electrodes are arranged within the housing to be parallel to the central longitudinal axis of the housing and are electrically connected in an individual manner to terminals housed in the feedthrough platforms, for applying bias signals thereto.

The housing walls adjacent to those to which are affixed the bias electrodes are thin. Four modulation electrodes are affixed to the outer surface of these walls in a symmetrical manner to which four modulation signals are applied from external sources.

In operation, the bias and modulation signals are applied to the respective electrodes. These signals interact with the molecular absorbing gas and laser beam to encode the beam as a function of frequency.

The symmetry and placement of the modulation electrodes provides the beam with encoded information as a function of frequency. The relative amplitude and frequency of respective modulation signals is determinative of position in the beam.

A third embodiment of the modulator includes a housing having optically transmissive endcaps contructed to form a gas-tight structure for enclosing a molecularly absorbing gas therein. Two semicircular disc electrodes are applied to each endcap by means of a photo-etch process, or the like. The electrodes are also partially transmissive to an applied laser beam. The electrodes on the same endcap have a small gap between them and the endcaps are rotated to have the gaps mutually perpendicular so as to allow for orthogonal encoding. Modulation and bias signals are applied to each electrode to provide for frequency encoding of an applied laser beam.

BRIEF DESCRIPTION OF THE DRAWINGS

The novel features of this invention, as well as the invention itself, will be better understood from the following description taken in connection with the accompanying drawings, in which like reference characters refer to like parts, and in which:

FIG. 5 is a longitudinal cross-sectional view of the modulator of FIG. 1;

FIG. 6 is a cross-sectional view of the modulator of FIG. 1 taken along the lines 6—6 of FIG. 5;

FIG. 7 is a cross-sectional view of the modulator of FIG. 1 taken along the lines 7—7 of FIG. 5;

FIG. 12 is a diagram of a second embodiment of a modulator constructed in accordance with the present invention;

FIG. 13 is a diagram of a third embodiment of a modulator constructed in accordance with the present invention; and FIG. 14 is an exploded view of the third embodiment of FIG. 13.

DETAILED DESCRIPTION OF THE INVENTION

Figure 1:
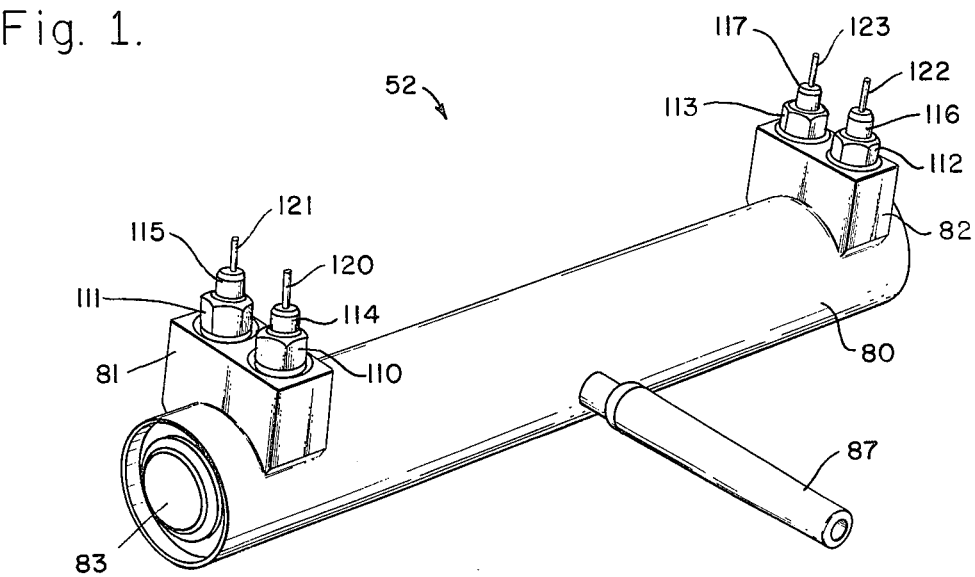
FIG. 1 is a perspective view of a modulator which may be used in the system of the present invention.

Referring now to FIG. 1, there is shown a perspective view of an embodiment of a novel modulator which may be employed in a guidance system constructed in accordance with the present invention. Therein is shown the modulator 52 having a housing 80, first endcap 83, feedthrough platforms 81, 82, feedthrough screws 110, 111, 112, 113, feedthrough insulators 114, 115, 116, 117, and electrical contacts 120, 121, 122, 123. A detailed description of the interrelationship of these elements is given below.

Figure 2:
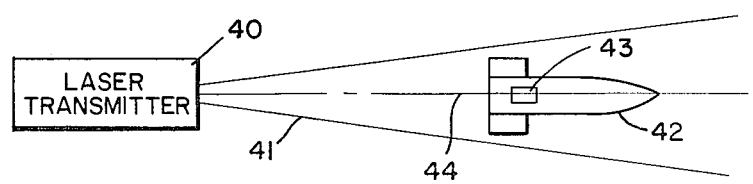
FIG. 2 is a diagram of a missile guidance system employing the principles of the present invention.

Referring now to FIG. 2 of the drawings, there is shown a missile guidance system in which a laser transmitter 40 emits a beam 41, encoded with directional information which is received by a receiver 43 located on a missile 42. Error signals decoded by the receiver 43 enable the missile 42 to fly along the laser line-of-sight 44.

Figure 3:
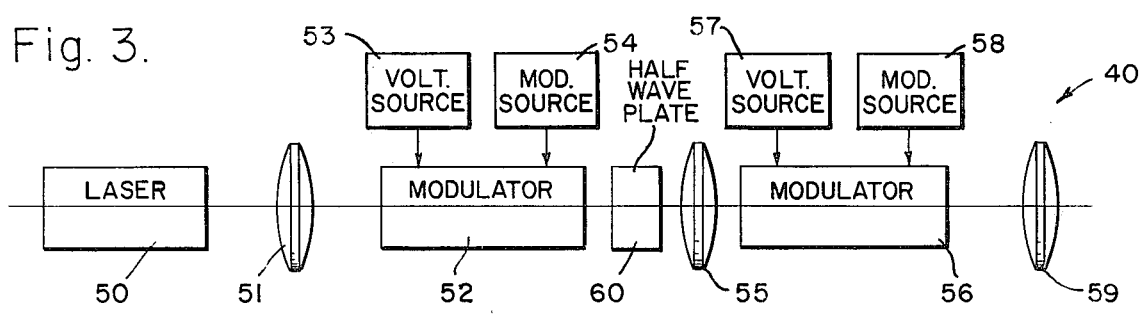
FIG. 3 is a diagram of a transmitter employing the modulator of FIG. 1 in the missile guidance system of FIG. 2.

According to one embodiment of the present invention, a laser transmitter 40, shown in FIG. 3, suitable for use in the missile guidance system of FIG. 2 includes a laser 50, a first lens 51, a first modulator 52, a half-wave plate 60, a second lens 55, a second modulator 56, and a third lens 59. These elements are optically aligned along an optical axis which defines the system optical axis, and which is collinear with the laser line-of-sight 44. Also shown are voltage sources 53, 57 and modulation sources 54, 58 which apply signals to the modulators 52, 56.

The three lenses 51, 55, 59 may be of any type suitable for focusing a laser beam without introducing significant distortion or dispersion. They may be, for example, lenses manufactured by II-VI Incorporated, which may be made of germanium, or any similar or equivalent type lens. The half-wave plate 60 which is made of a birefringent material such as cadmium sulfide or the like, is disposed so as to rotate the plane of polarization of the energy exiting the first modulator 52 by 180°.

The laser 50 is of the type whose beam can be modulated by molecular absorption techniques, as in Stark cell modulation, such as a $CO_2$ gas laser, or the like. A discussion of such modulation techniques may be found in a technical paper entitled "Wideband modulation of the $C^{13}O_2^{16}$ Laser R(18) Line at 10.874 $\mu$m with an $N^{14}H_3$ Stark Cell":, C. K. Asawa and T. K. Plant, Appl. Phys. Lett. 30, 96 (1977).

Stark cell type modulation of laser beams can occur in any material (solid, liquid or gas) that has absorption resonance at the laser frequency when the material is acted upon by an electric field. This effect occurs in both visible and infrared laser beams, but the process is most efficient with infrared lasers, such as $CO_2$ lasers, or the like.

In accordance with the present invention, the first and second modulators 52, 56 modulate the laser beam by means of molecular absorption, and are, in essence, modified Stark cell modulators, each being adapted to modulate a laser beam at two distinct frequencies, as will be explained hereinafter.

The first and second modulators 52, 56 may be identical in construction, but are oriented at 90° relative to one another in the transmitter of FIG. 2. The 90° rotation of the devices allows orthogonal encoding of the laser beam resulting in spatial encoding of the beam in two mutually perpendicular directions. Relative to the missile guidance system of FIG. 2, this allows the transmission of position information in both the horizontal and vertical directions which results in error and guidance signals relative to these horizontal and vertical reference directions.

The mutually perpendicular orientation of the two modulators 52, 56 is not required (i.e., they can be oriented at any angle), however, in most guidance applications, or the like, orthogonal axes of reference are usually chosen so as to represent horizontal and vertical.

Figure 4:
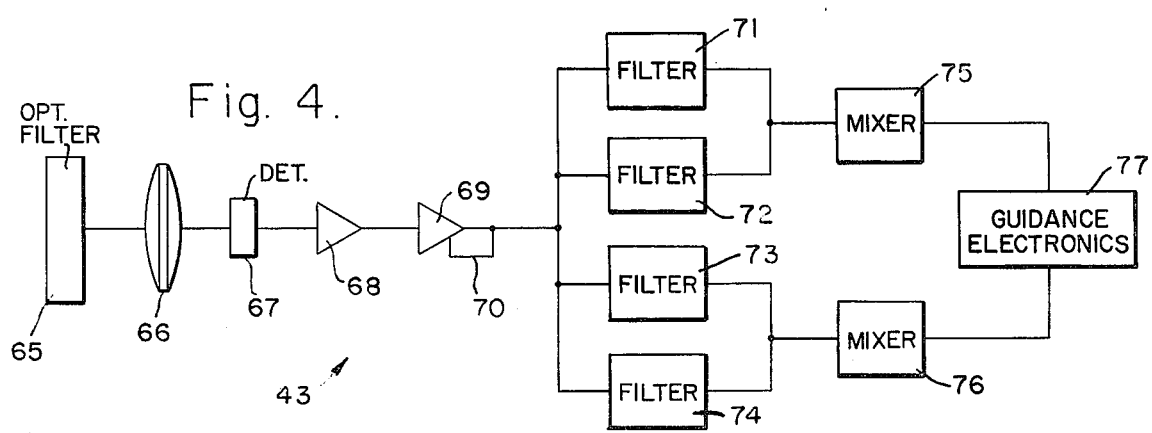
FIG. 4 is a diagram of a receiver for use with the transmitter of FIG. 3 in the missile guidance system of FIG. 2.

In accordance with the present invention, a receiver 43 suitable for use in the missile guidance system of FIG. 2 is illustrated in FIG. 4. Therein is shown an optical filter 65, a lens 66, a detector 67, a preamplifier 68, and an amplifier 69, with a feedback loop 70, four electrical filters 71, 72, 73, 74, two mixing devices 75, 76 and missile guidance electronics 77.

The optical filter 65 is of the type which transmits in a particular bandpass range, chosen to be compatible with the laser 50 and detector 67, and may be a multilayer coated piece of germanium, or the like. The coating is applied so as to transmit only desired wavelengths of energy which are detectible by the detector 67.

The lens 66 is similar to the lenses 51, 55, 59 of the transmitter 40 of FIG. 2 in that it is of conventional design such as manufactured by II-VI Incorporated or the like, and is chosen to focus incident laser energy onto the detector 67.

The detector 67 receives and detects incident laser energy and converts the optical energy into electrical signals. The detector 67 may be any conventional or well-known type, such as germanium, doped silicon, mercury cadmium telluride, or the like. Typical of this detector is Societe Anonyme de Telecommunications (SAT) detector type A1.

The preamplifier 68 accepts output signals from the detector 67, conditions and preamplifies these signals, and applies them to the amplifier 69.

The amplifier 69 accepts the signals from the preamplifier 68 and provides an amplified signal for use in the remaining elements of the receiver 43, and also for use in automatic gain control (AGC) by means of the feedback loop 70.

The electrical filters 71, 72, 73, 74 are provided to respond to signals from the amplifier 69 and pass only signals of predetermined frequencies. Each electrical filter 71, 72, 73, 74 is tuned to a different frequency, the particular frequencies corresponding to those encoded on the laser beam by the modulators 52, 56. The frequencies of the first pair of filters 71, 72 pass frequencies corresponding to the frequencies of the horizontal modulator 52 and the second pair of filters 73, 74 are tuned to the frequencies corresponding to those of the vertical modulator 56.

The first pair of electrical filters 71, 72 apply output signals to the first mixing device 75 which electrically mixes these signals to provide an output of the form of the difference voltage over the sum voltages, or $(V_2-V_1)/(V_2+V_1)$, which is the first error signal (i.e., horizontal).

Similarly, the electrical signals from the second pair of electrical filters 73, 74 are applied to the second mixing device 76, which provides an output signal of the form $(V_4-V_3)/(V_4+V_3)$, which is the second error signal (i.e., vertical). Both of the above error signals are then applied to the missile guidance electronics 77.

A further understanding of the present invention is obtained by referring to FIGS. 5 through 9. Therein are shown three views of the modulator 52 and the internal working structure.

Referring primarily to FIG. 5, the modulator 52 includes a cylindrical housing which may be made of stainless steel, or the like, having first and second endcaps 83, 85 affixed to respective ends thereof so as to form a gas-tight structure. Two feedthrough platforms 81, 82 are attached to the housing to provide support for the connectors and electrical contacts.

Figure 8:
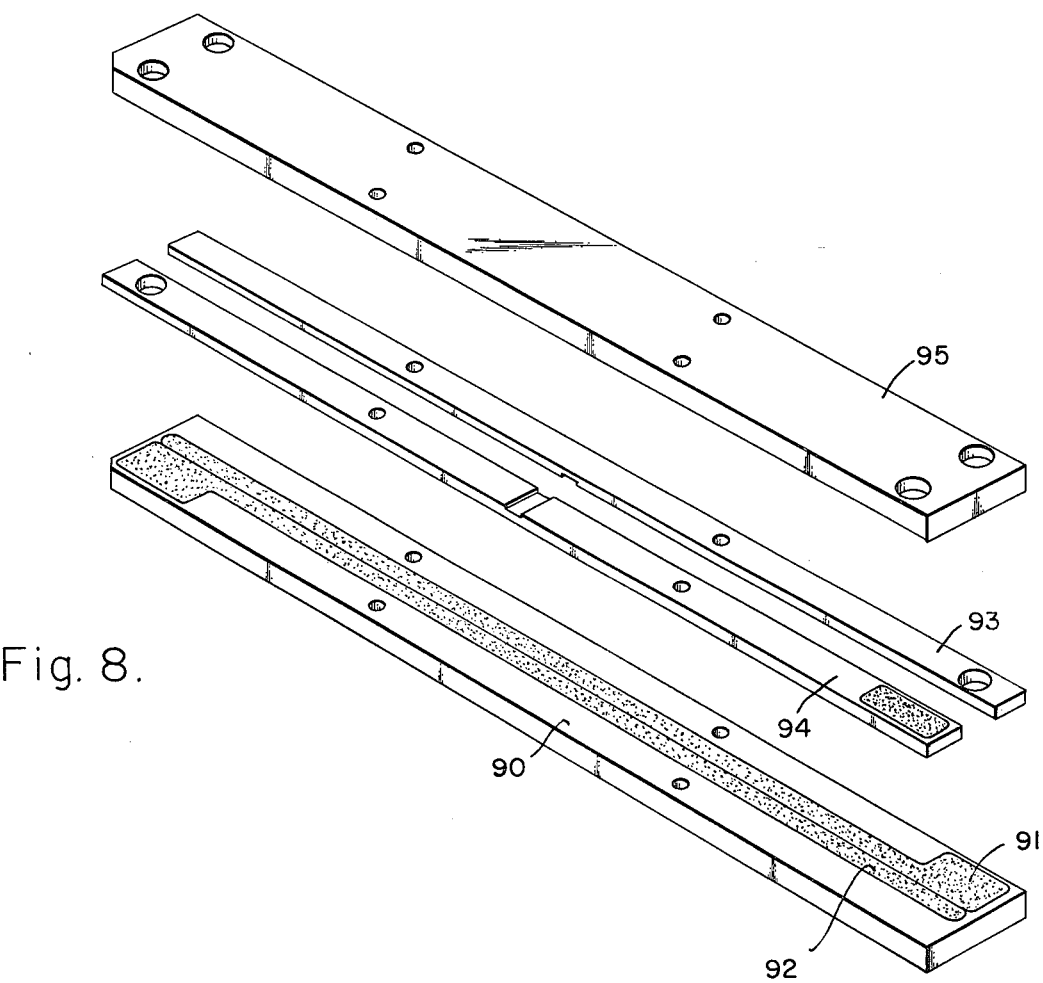
FIG. 8 is an exploded view of the internal working structure of the modulator of FIGS. 1, 5, 6 and 7.

Referring now to FIG. 8, which is an exploded view of the modulator 52, the primary internal components of the modulator are shown, including the bottom plate 90, which may be made of an insulating substrate material such as Beryllium Oxide (BeO) Isopress 995, or the like, distributed by Ceredyne, Inc. onto which are placed two electrodes 91, 92. These electrodes 91, 92 are deposited upon the surface of the plate 90 by a photo-etch process, or the like. The top plate 95 is identical to the bottom plate 90 and has two electrodes 96, 97 deposited on its lower surface.

Figure 9:
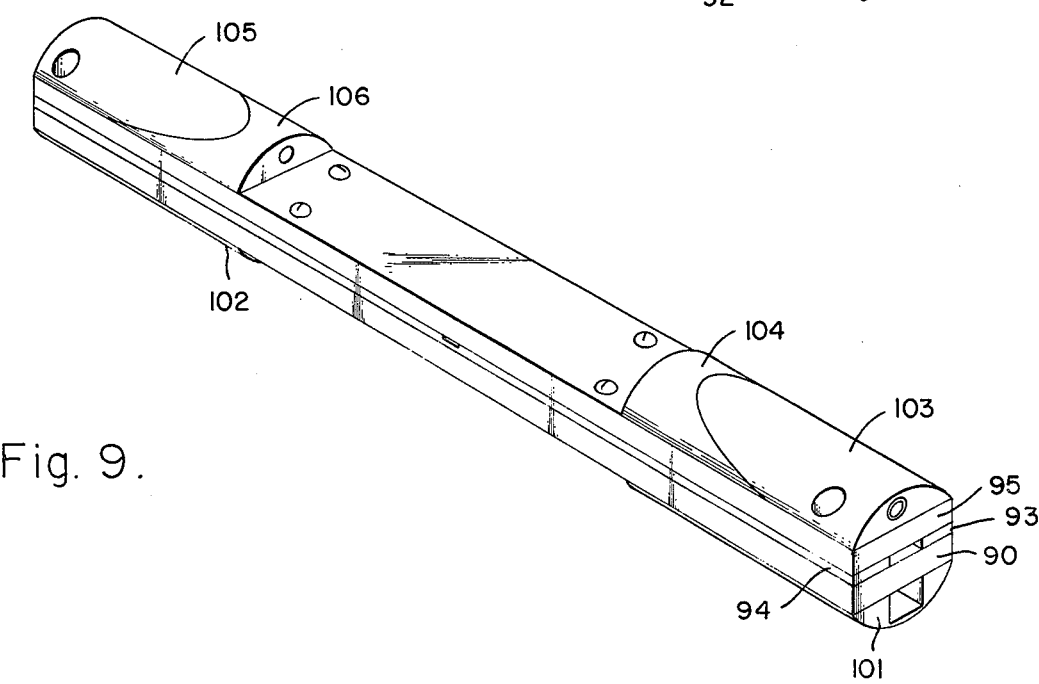
FIG. 9 is a view of the assembled internal working structure of the modulator of FIGS. 1 and 5–8.

Two spacers 93, 94, which may be made of an insulating material such as BeO Isopress 995, or the like, are sandwiched between the top and bottom plates 90, 95, and secured by screws, as best indicated in FIG. 9.

Holes are provided, as shown in FIG. 8, to allow a clearance fit for the insulators 114, 115, 116, 117 and electrical contacts 120, 121, 122, 123 which make contact with the electrodes 91, 92, 96, 97.

FIG. 9 shows the top and bottom plates 90, 95 and the spacers 93, 94 sandwiched together and secured with screws. Additionally, lower clamp blocks 101, 102 and wedges 103, 104, 105, 106, which may be made of stainless steel or the like, are shown, and their interrelationship with the aforementioned sandwich configuration may be seen.

The lower clamp blocks 101, 102 are longitudinal sections of cylinders having substantially the same radius as the internal radius of the cylindrical housing 80. The wedges 103, 104, 105, 106 are adjustment mechanisms which allow positioning and alignment of the electrodes 91, 92, 96, 97. Wedges 103 and 104 work together to form one adjustable wedge clamp; and similarly, wedges 105 and 106 work together to form a second wedge clamp.

Referring primarily to FIG. 5, each of the wedges 103, 104 is made as a longitudinal section of a cylinder, but sliced at a diagonal to allow lateral motion between the adjacent wedges 103, 104. Each wedge 103, 104 is drilled, tapped and counterbored to allow insertion of a specially machined screw 108 which allows for relative motion between each of the wedges 103, 104 in a sliding manner, when the assembly is slid into the housing 80, tightening the screw 108 slides the wedges 103, 104 together, thus increasing the effective diameter of the assembly of FIG. 9, resulting in locking the assembly in place inside the housing 80.

Additionally, two spacers 84, 86 are provided to secure the internal working structure of FIG. 9 into the housing 80. The spacers 84, 86 may be made of an insulating material such as BeO Isopress 995, or the like. The spacers 84, 86 are configured to secure the assembly of FIG. 9 from moving in both longitudinal and lateral directions and are secured in place when the endcaps 83, 85 are affixed to the housing 80.

Referring again to FIG. 9, the lower clamp blocks 101, 102 have grooves milled in them to allow free flow of gas internal to the housing 80. Also the two spacers 93, 94 (best seen in FIG. 8) have small grooves milled in them for the same purpose.

As shown in FIG. 8, the electrodes 91, 92 are configured to be substantially the same length and laid in the same plane. The gap between the two electrodes 91, 92 is approximately five-thousandths of one inch.

Referring now to FIG. 6, and in particular to the first feedthrough platform 81, there is shown a first feedthrough screw 110 which is threadably connected to the platform 81. The screw 110 is provided with a hole extending axially through its body to accept an insulator 114 which is affixed to the screw 110 by means of glue, or the like. The insulator 114 has an electrical contact 120 glued in a hole provided therein, and the contact 120 is soldered to the first electrode 91. Holes are provided through the platform 81, housing 80, wedge 103, top plate 95 and spacer 93 to accept the insulator 114 and permit the contact 120 to extend to the electrode 91 and connect thereto.

This arrangement is substantially duplicated in the remaining three connector assemblies, but with each electrical contact 121, 122, 123 connecting to its own respective electrode 92, 96, 97.

Thus, it is apparent that a modified Stark cell has been provided, the modification of which comprises utilizing split Stark cell plates. These split plates or electrodes act in a capacitor-like manner to allow application of bias and modulation signals to an applied laser beam. The electrodes are configured to allow a laser beam to pass between them allowing the interaction between the applied bias and modulating fields, molecular absorbing gas and laser beam. The resultant interaction yields the desired beam encoding.

In operation, an absorbing gas such as $N^{14}H_3$, or the like, is supplied to the inside of the housing 80 by means of the gas fill tube 87. First bias and modulation signals are applied to electrodes 91, 96 by the sources 53, 54 and second bias and modulation signals are applied to electrodes 92, 97 by sources 57, 58. The signals applied by source 54 are at one specific frequency and those applied by source 58 are at a second frequency.

Typical of the modulation signals used are 50 VAC at 20 to 25 KHz. Typical bias voltages are on the order of 500 VDC to 1500 VDC.

A laser beam emitted by the laser 50, having the property that it can interact in the required manner with the absorbing gas is focused on the first modulator 52 by the first lens 51. The endcaps 83, 85 have a transmissive portion at the center of the endcap 83, 85 which allows the beam to be transmitted through the modulator 52.

Figure 10:
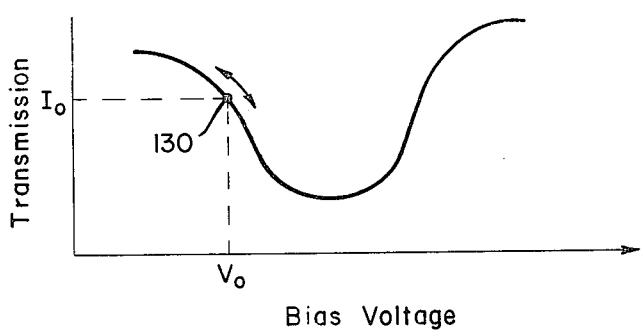
FIG. 10 is a graph of transmission versus bias voltage for the modulator of the present invention.

The laser beam emitted by the laser 50 propagates down the optical axis and is focused by the first lens 51 at the center of the first modulator 52. The gaseous medium contained within the first modulator 52 interacts with the laser beam whereby a process of molecular absorption takes place in the presence of an applied electric field. The required electric field is applied to both pairs of electrodes 91, 96, and 92, 97, by means of the bias and modulation sources, 53, 54. FIG. 10 shows a typical transmission curve as a function of bias voltage for a single pair of biased electrodes (such as 91, 96).

Operation of the first modulator 52 at a particular bias voltage $V_o$ (dotted lines in FIG. 10) results in a certain transmission $I_o$ (point 130). Application of a modulation signal from the modulation source 54 at a particular frequency $\omega_1$, in addition to the bias voltage induces a frequency modulation into the transmission curve. As shown in FIG. 10, the frequency modulated bias voltage allows the transmission of the first modulator 52 to vary as a function of the frequency of modulation and thus point 130 moves up and down the curve as indicated by the arrows. Similarly, electrodes 92, 97 have a bias voltage applied to them but at a different modulation frequency $\omega_2$.

The symmetry of electrode placement coupled with their offset from the central axis allows the modulation effect induced in the laser beam 41 to be contoured such that the amplitude of the frequency modulation at $\omega_1$ is a maximum at the edge of the beam 40 closest to electrodes 91, 96 and at a minimum at the opposite edge of the beam 41. Conversely, the amplitude of frequency modulation associated with $\omega_2$ is just the opposite, being a maximum at the edge of the beam 41 closest to electrodes 92, 97 and diminishing to a minimum at the opposite edge of the beam 41.

Thus the beam 41 is spatially encoded as a function of position in the beam 41 which is directly related to the amounts of modulated signal detected at either $\omega_1$ or $\omega_2$. This encoding is across one dimension of the beam 41, i.e., horizontal. The second direction (typically vertical) is obtained by means of the second modulator 56 rotated 90° with respect to the first modulator 52, and positioned in series therewith so that encoding can be applied in the second direction. The half-wave plate 60 is inserted to rotate the plane of polarization of the laser energy before entering the second modulator 56.

Figure 11:
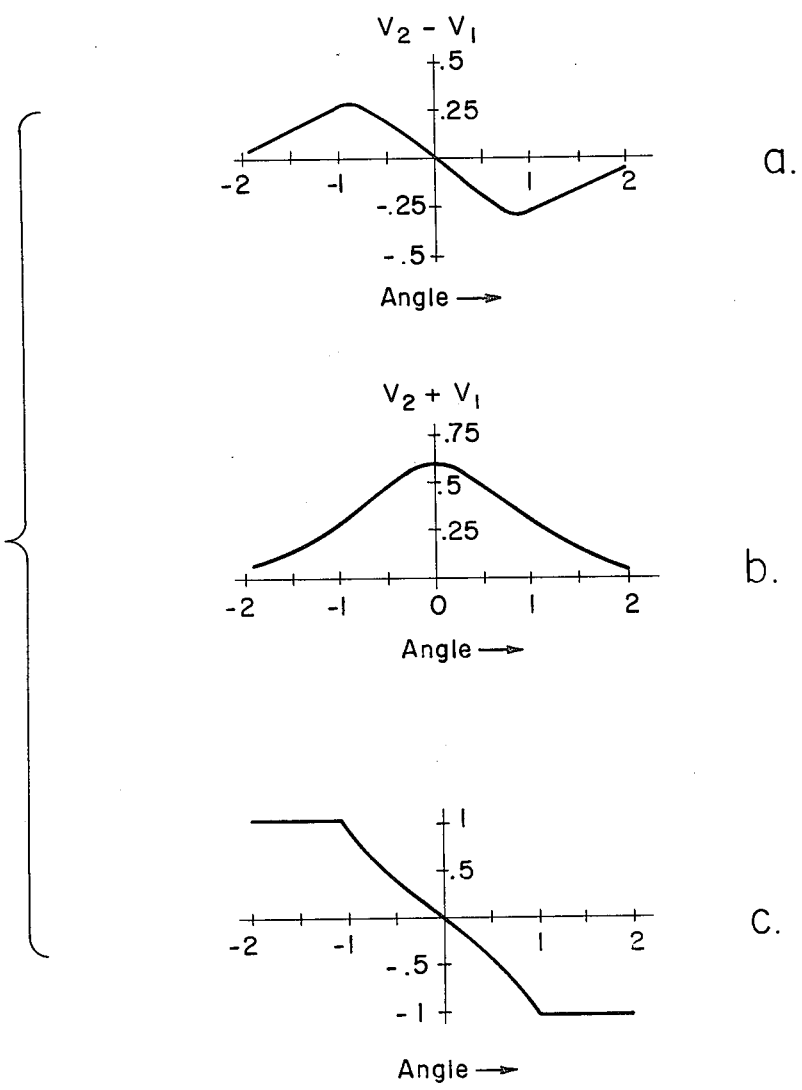
FIGS. 11a, b and c are graphs of guidance signals produced by an operational embodiment of the present invention.

Apparatus utilizing the components of the present invention actually has been operated, with typical data shown in FIG. 11. FIG. 11a shows the output of the receiver indicative of the difference in voltage at the two frequencies, while FIG. 11b is indicative of the sum of these voltages. FIG. 11c shows the appropriate guidance signal which may be applied to the missile guidance electronics 77.

The tests performed were static in nature, not involving a missile. Data was obtained utilizing the transmitter-receiver combination over a range of one to five kilometers.

A second embodiment of the modulator is shown in FIG. 12. Therein is shown a modulator which encodes a laser beam with position information along two dimensions of the beam (horizontal and vertical) utilizing four modulation frequencies. The modulator includes a housing 141, two end members 150, 151, a first pair of electrodes 142, 143 a second pair of electrodes 144, 146, a third pair of electrodes 145, 147 and two feedthrough assemblies 148, 149.

The housing 141, which may be made of ceramic, plastic or other suitable material, has two end members 150, 151 affixed to the ends thereof to form a gas-tight structure for confining a gaseous medium. The end members 150, 151 are optically transmissive to an applied laser beam and may be made of germanium, or the like.

The first electrodes 142, 143 are disposed parallel to and coextensive with each other and spaced apart laterally inside the housing 141. These electrodes 142, 143 are also parallel to the central longitudinal axis of the device.

Two feedthrough assemblies 148, 149 as described in the first embodiment are conductively connected to the first pair of electrodes 142, 143 in an individual manner. The two feedthrough assemblies 148, 149 are affixed to the outside of the housing 141 with conductive means protruding through the wall of the housing 141 to connect to the electrodes 142, 143.

The second and third pairs of electrodes 144, 145, 146, 147 are affixed to the outside of the housing 141 along the two walls adjacent to the first pair of electrodes 142, 143. The walls of the housing 141 to which the second and third pairs of electrodes 144, 145, 146, 147 are affixed are thin so as to allow for easier penetration of the modulation fields emanating from each of the electrodes 144, 145, 146, 147.

The electrodes 144, 145 of the second pair are disposed parallel to and coextensive with each other and parallel to the central longitudinal axis of the housing 141 and are affixed to one of the thin walls.

Similarly, the electrodes 146, 147 of the third pair are disposed parallel to and coextensive with each other and parallel to the central longitudinal axis but are affixed to the opposite wall of the housing 141.

In operation, a bias voltage of 500–1500 VDC is applied to the first pair of electrodes 142, 143. The molecular absorption gas is thus biased which gives rise to the transmission curve of FIG. 10.

Four modulation signals are applied to the four electrodes 144, 145, 146, 147 from the modulation source 54. Modulation signals are typically on the order of 50 VAC at 20 KHz or 25 KHz, as indicated in the first embodiment.

The applied modulation signals vary from a maximum amplitude at a point in the beam closest to each respective electrode 144, 145, 146, 147 to a minimum amplitude at a point in the beam diametrically opposite the electrode 144, 145, 146, 147.

Thus position in an applied beam is a function of the amplitude and frequency of each of the four modulation signals, with equal amounts of all four signals indicating beam center. A comparison of the amplitudes of the four modulation signals indicates the relative position in the beam. Comparision of these signals is done with a microcomputer circuit, or equivalent, as part of the missile guidance electronics 77.

A third embodiment of the encoding device is shown in FIGS. 13 and 14. Therein is shown a housing 156, two end members 157, 158 four semi-circular disc electrodes 160, 161, 162, 163 and four conductive elements 165, 166, 167, 168.

The end members 157, 158 are affixed to the housing 156 so as to produce a gas-tight enclosure to contain a gaseous medium therein. The end members are optically transmissive to laser energy and may be made of germanium or the like. The housing may be made of ceramic, plastic, or the like.

The four semi-circular disc electrodes 160, 161, 162, 163 are of the type which are partially transmissive to applied laser energy and are electrically conductive. Two of the electrodes 160, 162 are affixed to one end member 158 and the remaining two electrodes 161, 163 are affixed to the other end member 157. These electrodes 160, 161, 162, 163 are disposed on their respective end members 157, 158, so as to allow a gap between two electrodes affixed to the same end member. The four electrodes 160, 161, 162, 163 are oriented such that the gaps of the respective end members 157, 158 are mutually perpendicular to allow for orthogonal (horizontal and vertical ) encoding directions.

Four conductive elements 165, 166, 167, 168 are attached individually to the four semi-circular electrodes 160, 161, 162, 163 to allow for connection to external voltage and modulation sources (such as 53 and 54 of FIG. 2). These conductive elements 165, 166, 167, 168 may be attached to the electrodes 160, 161, 162, 163 by soldering or laser welding, or the like, and can be made of copper, silver or any available suitable conductive material.

Although the present invention has been shown with reference to a beam-rider guided missile application, it should be readily apparent that there are other obvious uses of the present invention. Such applications would include apparatus to guide tunnel-drilling or construction equipment, or machinery that would grade or pave a straight road. Typically, any situation that calls for guiding an object along a straight line path would find use for the present invention.

Thus, there has been described a laser guidance system which is insensitive to transmitter-receiver separation and incorporates automatic gain control and stabilizing electronics. Inherent difficulties in previous systems have been overcome by the use of a single detector in the receiver, allowing for automatic gain control over a wide dynamic range. A plurality of dimensions of the laser beam can now be encoded so as to provide position information for guidance purposes or the like.

Although the present invention has been shown utilizing symmetrical electrode placement, such symmetry is not absolutely required, and we do not want to be limited by this. Asymmetric electrode placement would require more complicated receiver or missile guidance electronics to adequately decode the transmitted information. Generally, however, the symmetric geometry allows for a simplified design and manufacture and less complicated electronics, and hence is usually desirable.

It is to be understood that the above-described embodiments of the invention are merely illustrative of the many possible specific embodiments which represent applications of the principles of the present invention. Numerous and varied other arrangements can readily be devised in accordance with these principles by those skilled in the art without departing from the spirit and scope of the invention.

What is claimed is:

1. Apparatus for spatially encoding a laser beam across at least one dimension of said beam in a manner indicative of position in said beam, said encoding being determined by the relative amplitude and frequency of first and second modulation potentials, said apparatus comprising:
   a housing;
   a pair of endcaps optically transmissive to said laser beam and affixed to respective ends of said housing to form a gas-tight structure;
   a molecular absorbing gas disposed within said structure;
   a plurality of electrodes disposed parallel and coextensive with each other, positioned symmetrically about a central longitudinal axis of said housing, a first pair of said electrodes being coextensive and lying in the same plane and offset from said central longitudinal axis in one direction, and a second pair of said electrodes being coextensive and lying in the same plane and offset from the central longitudinal axis in the opposite direction from said first pair of said electrodes respective ones of said first pair of said electrodes being oppositely disposed from respective ones of said second pair of said electrodes; and
   connector means extending through said housing for applying said first and second modulation potentials across respective opposed electrodes.

2. A modified Stark cell comprising:
   a gas-tight enclosure;
   optically transparent endcaps affixed to respective ends of said enclosure;
   a molecular absorbing gas disposed within said enclosure; and
   split Stark cell electrodes disposed along a central longitudinal axis of said enclosure, a first pair of said electrodes separated from one another, and lying in a first plane which is displaced from said central longitudinal axis in one direction, and a second pair of said electrodes separated from one another, and disposed in a second plane which is on the opposite side of said central longitudinal axis from said first plane.

3. A modified Stark cell modulator for modulating a laser beam by means of molecular absorption and application of two predetermined modulation frequencies to said beam indicative of position in the beam, said modulator comprising:
- a gas-tight housing;
- optically transmissive endcaps affixed to respective ends of said housing; and
- four planar electrodes disposed internal to said gas-tight housing in such a manner that a first pair of electrodes is coextensive, lying in a first plane and separated by a first predetermined gap, said first plane being displaced from the central longitudinal axis of said housing in one direction, and a second pair of said electrodes being coextensive, lying in a second plane and separated by said first predetermined gap, said second plane being displaced from said central longitudinal axis in the opposite direction from said first pair of electrodes.

4. A laser modulator for encoding position information across one dimension of a laser beam as a function of two encoding frequencies, comprising:
- first, second, third, and fourth planar electrodes disposed parallel to an optical axis through said modulator, said first and second electrodes being parallel to each other and separated a first predetermined distance, said third and fourth electrodes being parallel to each other and separated by said first predetermined distance, said first and third electrodes lying in the same plane and separated by a second predetermined distance, and said second and fourth electrodes lying in the same plane and separated by said second predetermined distance;
- a housing in which said first, second, third and fourth planar electrodes are affixed;
- a molecular absorbing gas disposed within said housing;
- four feedthrough connectors attached to said housing, one associated with each of said electrodes, each disposed so so as to make electrical contact with an associated one of said electrodes and allow external connection to a source of applied modulation voltages generated external to said modulator; and
- first and second optical windows affixed to respective ends of said housing;
- whereby when an applied modulation voltage at a first modulation frequency is applied to said first and second planar electrodes, an applied modulation voltage having a second modulation frequency is applied to said third and fourth planar electrodes, a laser beam applied through said apparatus is modulated in a manner such that the intensities of modulation components at said first and second modulation frequencies are substantially the same on said optical axis, and the intensities of modulation components at said first and second modulation frequencies increase in strength when progressing along an axis parallel to said first and second planar electrodes and away from said optical axis of said modulator, thus providing spatial encoding of said laser beam as a function of the strength of said modulation components at first or second modulation frequencies.

5. Apparatus for encoding a laser beam by modulation thereof with signals of two different frequencies in a manner indicative of position along at least one dimension of said beam as a function of the relative intensities of said two signals, comprising:
- a housing;
- end members affixed to said housing and having axially aligned optically transmissive windows, said end members and said housing being adapted to provide a gas-tight structure;
- a molecular absorbing gaseous medium disposed within said gas-tight structure;
- first and second elongated electrodes disposed parallel to and coextensive with each other and spaced apart laterally, said first and second electrodes being offset away from the central longitudinal axis of said housing in one direction and parallel to said axis;
- third and fourth elongated electrodes disposed parallel to and coextensive with each other and spaced apart laterally, said first and second electrodes being offset away from the central longitudinal axis of said housing in a direction opposite to that of said first and second electrodes and parallel to each other, said electrodes being symmetrical to each other and disposed symmetrically about said central longitudinal axis of said housing; and
- four conductive elements extending through said housing, said four conductive elements being individually conductively connected to each of said electrodes.

6. Apparatus for encoding a laser beam by modulation thereof with signals of four different frequencies in a manner indicative of two dimensions of said beam as a function of the relative intensities of said four signals, comprising:
- a housing;
- end members fastened to said housing and having axially aligned optically transmissive windows, said end members and said housing providing a gas-tight structure;
- a molecular absorbing gaseous medium disposed within said housing;
- a first pair of electrodes disposed parallel and coextensive and spaced apart laterally, said first pair of electrodes being parallel to the central longitudinal axis of said housing;
- a second pair of electrodes affixed externally to one of said housing walls adjacent to said first pair of electrodes, said second pair of electrodes being disposed parallel and coextensive and parallel to said central longitudinal axis and separated laterally;
- a third pair of electrodes affixed externally to the wall of said housing opposite to that to which said second pair of electrodes is affixed, said third pair of electrodes being parallel and coextensive and parallel to said central longitudinal axis and separated laterally; and
- two conductive elements extending through said housing, said two conductive elements being individually conductively connected to each electrode of said first pair of electrodes.

7. Apparatus for encoding a laser beam by modulation thereof with signals of four different frequencies in a manner indicative of position relative to two dimensions of said beam as a function of the relative intensities of modulation components at said four frequencies, said apparatus comprising:
- a gas-tight enclosure;
- two optically transmissive endcaps affixed to respective ends of said enclosure;
- a molecular absorbing gas disposed within said enclosure; and
- first, second, third and fourth optically transmissive semicircular disc electrodes, said first and second electrodes being affixed to the internal surface of one of said endcaps and having a fixed gap between said electrodes, said third and fourth electrodes being affixed to the internal surface of the other of said endcaps and being separated by said fixed gap, said third and fourth electrodes being positioned such that the orientation of said fixed gap is perpendicular to the orientation of said fixed gap between said first and second electrodes, said first, second, third and fourth electrodes being optically transmissive to said laser beam.

8. Apparatus for spatially encoding a laser beam indicative of position in said beam, comprising:
- a gas-tight enclosure;
- a plurality of optically transmissive endcaps affixed thereto; and
- first, second, third and fourth planar electrodes disposed within said enclosure wherein the first and second electrodes lie in the same plane and are separated by a fixed distance and the third and fourth electrodes lie in the same plane and are separated by said fixed distance, said first and second electrodes being disposed in an opposed relationship to said third and fourth electrodes respectively, positioned symmetrically about a central longitudinal axis of said enclosure, separated by a distance which allows said laser beam to traverse said enclosure.

9. Apparatus for spatially encoding a laser beam indicative of position in said beam, comprising:
- a gas-tight enclosure;
- a plurality of optically transmissive endcaps affixed thereto;
- a molecular absorbing gas disposed within said enclosure; and
- four planar electrodes disposed internal to said gas-tight enclosure in such a manner than a first pair of electrodes in coextensive, lying in the same plane and separated by a first predetermined distance, said first pair of electrodes being displaced from a central longitudinal axis of said enclosure in one direction, and a second pair of said electrodes being coextensive, lying in the same plane and separated by said first predetermined gap, said second pair of electrodes being displaced from said central longitudinal axis in the opposite direction from said first pair of electrodes.

10. Apparatus for producing a laser beam which is spatially encoded across at least one dimension thereof in a manner indicative of position in said beam, said encoding being determined by the relative amplitude and frequency of two modulation signals applied to said apparatus, said apparatus comprising:
- a laser;
- a housing;
- a pair of endcaps optically transmissive to said laser beam and affixed to said housing to form a gas-tight structure;
- a molecular absorbing gas disposed within said gas-tight structure;
- a plurality of electrodes placed parallel and coextensive with each other, positioned symmetrically about a central longitudinal axis of said housing, a first pair of said electrodes being coextensive and lying in the same plane and offset from said central longitudinal axis in one direction, and a second pair of said electrodes being coextensive and lying in the same plane and offset from the central longitudinal axis in the opposite direction from said first pair of said electrodes; and
- means for applying said two modulation signals to said plurality of electrodes so as to allow encoding of at least one dimension of said beam;
- said laser beam being disposed such that its output beam is applied along said central longitudinal axis of said housing.

* * * * *